(12) United States Patent
Kasorla et al.

(10) Patent No.: US 9,779,038 B2
(45) Date of Patent: Oct. 3, 2017

(54) EFFICIENT SUSPEND-RESUME OPERATION IN MEMORY DEVICES

(71) Applicant: Apple Inc., Cupertino, CA (US)

(72) Inventors: Yoav Kasorla, Herzliya (IL); Asaf Schushan, Herzliya (IL); Asaf Vega, Herzliya (IL); Eyal Gurgi, Herzliya (IL); Shai Ojalvo, Herzliya (IL)

(73) Assignee: Apple Inc., Cupertino, CA (US)

( * ) Notice: Subject to any disclaimer, the term of this patent is extended or adjusted under 35 U.S.C. 154(b) by 164 days.

(21) Appl. No.: 13/755,547

(22) Filed: Jan. 31, 2013

(65) Prior Publication Data

US 2014/0215175 A1    Jul. 31, 2014

(51) Int. Cl.
| G11C 7/10 | (2006.01) |
| G06F 13/16 | (2006.01) |
| G06F 13/24 | (2006.01) |
| G06F 13/26 | (2006.01) |

(52) U.S. Cl.
CPC .......... *G06F 13/161* (2013.01); *G06F 13/24* (2013.01); *G06F 13/26* (2013.01)

(58) Field of Classification Search
CPC .......... G06F 3/061; G06F 3/0659; G06F 9/00; G06F 9/4418; G06F 13/00; G06F 13/18; G06F 13/161; G06F 13/1652; G06F 13/1689; G06F 13/225; G06F 13/24; G06F 13/26; G06F 13/28; G06F 13/1642

USPC .......................................... 711/167, 147, 154
See application file for complete search history.

(56) References Cited

U.S. PATENT DOCUMENTS

| 5,805,501 | A | 9/1998 | Shiau et al. |
| 5,881,264 | A * | 3/1999 | Kurosawa ........... G06F 13/1689 712/217 |
| 6,349,321 | B1 * | 2/2002 | Katayama ............. G06F 9/4881 718/102 |
| 6,717,852 | B2 | 4/2004 | Honda et al. |
| 7,110,301 | B2 | 9/2006 | Lee et al. |
| 7,404,033 | B2 | 7/2008 | Li et al. |
| 7,451,447 | B1 * | 11/2008 | Deshpande ................... 718/102 |
| 7,844,970 | B2 * | 11/2010 | Theurer ....................... 718/103 |
| 2007/0204270 | A1 * | 8/2007 | Shin ............................ 718/103 |
| 2007/0239926 | A1 * | 10/2007 | Gyl et al. ...................... 711/103 |
| 2010/0049913 | A1 * | 2/2010 | Marcu et al. .................. 711/114 |
| 2012/0203986 | A1 * | 8/2012 | Strasser ................ G06F 3/0611 711/158 |
| 2012/0254515 | A1 * | 10/2012 | Melik-Martirosian G11C 16/14 711/103 |

* cited by examiner

*Primary Examiner* — Hashem Farrokh
*Assistant Examiner* — Tracy A Warren
(74) *Attorney, Agent, or Firm* — Meyertons, Hood, Kivlin, Kowert & Goetzel, P.C.

(57) ABSTRACT

A method includes executing a first memory access operation in a memory. A progress indication, which is indicative of a progress of execution of the first memory access operation, is obtained from the memory. Based on the progress indication, a decision is made whether to suspend the execution of the first memory access operation in order to execute a second memory access operation.

21 Claims, 2 Drawing Sheets

EFFICIENT SUSPEND-RESUME OPERATION IN MEMORY DEVICES

FIELD OF THE INVENTION

The present invention relates generally to data storage, and particularly to efficient suspension and resumption of data storage operation.

BACKGROUND OF THE INVENTION

In some types of memory, such as Flash memory, erasure and programming commands have a long execution time during which the memory is busy. Other commands, such as read commands, remain pending until the erasure or programming command is completed, and may therefore suffer long delays. Several techniques are known in the art for mitigating the long delay caused by such commands.

For example, U.S. Pat. No. 7,404,033, whose disclosure is incorporated herein by reference, describes a method for reading while writing to a single-partition Flash memory. A device manager receives an operation request for a memory device. The device manager suspends interrupts to be serviced and determines if there is sufficient time available to perform the requested operation. If there is sufficient time available and the device manager is in an exclusive mode, the state of the memory device is checked to determine if it is currently executing an operation. If so, this operation is suspended and the requested operation is issued to the memory device. The device manager polls the memory device to determine when the requested operation has been completed. Upon completion, the interrupts are re-enabled and control of the memory device is returned to the system.

U.S. Pat. No. 7,110,301, whose disclosure is incorporated herein by reference, describes a non-volatile semiconductor memory device that includes memory blocks and an erase controller configured to control a multi-block erase operation where at least two of the memory blocks are simultaneously erased. In some embodiments, if a suspend command is received by the memory device while selected memory blocks are being erased, the erase operation ceases and another operation, such as a read operation, begins. When a resume command is received by the memory device, the erase operation resumes.

U.S. Pat. No. 6,717,852, whose disclosure is incorporated herein by reference, describes a semiconductor memory device that allows concurrent execution of a write/erase operation and a read operation.

U.S. Pat. No. 5,805,501, whose disclosure is incorporated herein by reference, describes a Flash memory device that includes a multiple-checkpoint erase suspend algorithm. A user may issue an erase suspend command anytime during an erase process. The erase procedure is suspended as fast as possible by allowing the erase procedure to be suspended at the first to occur of a plurality of checkpoints in the process.

U.S. Patent Application Publication 2012/0254515, whose disclosure is incorporated herein by reference, describes a method for suspending an erase operation performed on a group of memory cells in a Flash memory circuit. One example method includes providing to the memory circuit a command to erase the group of memory cells via a plurality of erase pulses. After applying an erase pulse, if it is determined that another operation has a priority higher than a predetermined threshold, the method suspends the erase operation, performs the other operation, and then resumes the erase operation.

SUMMARY OF THE INVENTION

An embodiment of the present invention that is described herein provides a method including executing a first memory access operation in a memory. A progress indication, which is indicative of a progress of execution of the first memory access operation, is obtained from the memory. Based on the progress indication, a decision is made whether to suspend the execution of the first memory access operation in order to execute a second memory access operation.

In some embodiments, the first memory access operation includes a programming command or an erasure command, and the second memory command includes a read command. In an embodiment, deciding whether to suspend the execution includes choosing, based on the progress indication, between suspending the execution, allowing the execution to complete and aborting the execution.

In a disclosed embodiment, deciding whether to suspend the execution includes estimating a first time at which the second memory access command will complete if the execution of the first memory access command is suspended, estimating a second time at which the second memory access command will complete if the execution of the first memory access command is not suspended, and choosing to suspend the execution only if the first time is earlier than the second time.

In another embodiment, deciding whether to suspend the execution includes choosing between suspending and completing the execution based on a time overhead incurred by suspension of the first memory access command. In yet another embodiment, obtaining the progress indication includes reading the progress indication from a register of the memory that is accessible during the execution of the first memory access operation.

In still another embodiment, executing the first memory access operation includes performing a sequence of programming or erasure iterations, and obtaining the progress indication includes obtaining a count of the programming or erasure iterations that have been performed. In an embodiment, executing the first memory access operation includes performing a sequence of programming or erasure iterations, and obtaining the progress indication includes obtaining a count of memory cells whose programming or erasure has been completed. In another embodiment, executing the first memory access operation includes erasing a region of the memory, and obtaining the progress indication includes obtaining a portion of the region whose erasure has been completed.

In a disclosed embodiment, deciding whether to suspend the execution includes estimating an expected length of the execution, and choosing whether to suspend the execution based on the estimated expected length. In an embodiment, obtaining the progress indication includes reading from the memory a flag that is set to a first value when suspension of the execution will expedite completion of the second memory access command, and is set to a second value when the suspension of the execution will delay the completion of the second memory access command.

There is additionally provided, in accordance with an embodiment of the present invention, apparatus including a memory and an interface. The interface is configured to communicate with a memory. The storage circuitry is configured to execute a first memory access operation in the memory, to obtain from the memory a progress indication that is indicative of a progress of execution of the first memory access operation, and, based on the progress indication, to decide whether to suspend the execution of the first memory access operation in order to execute a second memory access operation.

There is additionally provided, in accordance with an embodiment of the present invention, apparatus including a memory and storage circuitry. The storage circuitry is configured to execute a first memory access operation in the memory, to obtain from the memory a progress indication that is indicative of a progress of execution of the first memory access operation, and, based on the progress indication, to decide whether to suspend the execution of the first memory access operation in order to execute a second memory access operation.

The present invention will be more fully understood from the following detailed description of the embodiments thereof, taken together with the drawings in which:

DETAILED DESCRIPTION OF EMBODIMENTS

Overview

Figure 1:
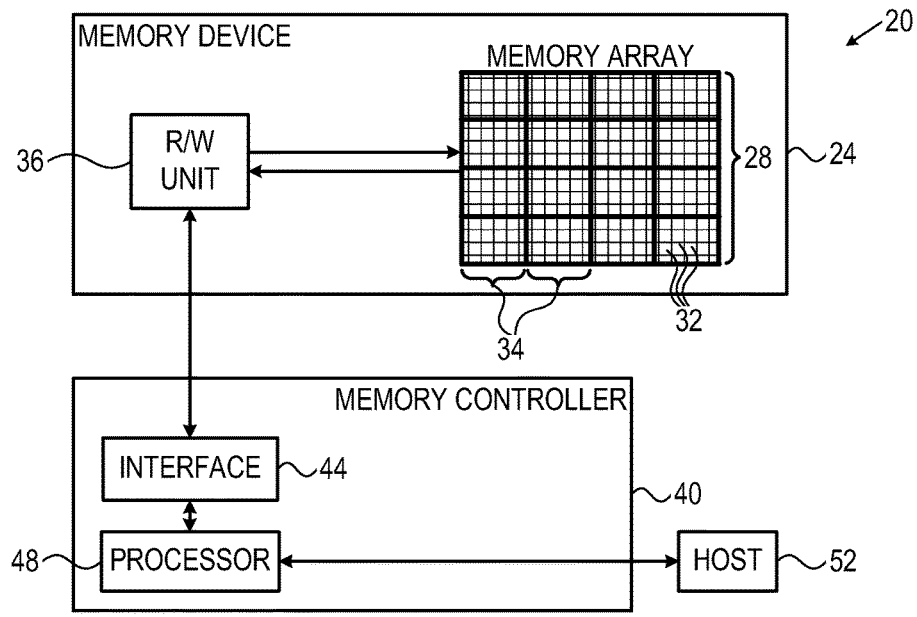
FIG. 1 is a block diagram that schematically illustrates a memory system, in accordance with an embodiment of the present invention.

Embodiments of the present invention that are described herein provide improved methods and systems for executing memory access commands. In some embodiments, a memory controller executes memory access commands such as read, program (write) and erase commands in a Flash memory. Typically, read commands are relatively short to execute, e.g., on the order of 40-50 μSec (sense only, or on the order of 120 μSec including data transfer time), whereas program and erase commands are considerably longer, e.g., on the order of 3-5 mSec or even 5-10 mSec.

In order to prevent erase or program commands from causing long delays to other commands, the memory and the memory controller carry out a conditional suspend-resume scheme that is described in detail hereinbelow.

Consider an example situation in which a read command is initiated while an erase or program command is already in progress. In this example, the target performance to be optimized is the read command latency, possibly at the expense of the erase or program command latency. If the erase or program command is in its early stages of execution, it will usually be preferable to suspend it temporarily and execute the read command. In the very early stages of execution, it may even be preferable to abort the erase or program command altogether, and restart it after executing the read command. On the other hand, if the erase or program command is already near completion, it may be preferable to allow it to complete rather than suspend. The above trade-offs depend, for example, on the length of the erase or program command, the length of the read command, and the overhead associated with suspending and resuming the erase or program command.

In some embodiments, when preparing to execute the read command, the memory controller assesses the progress of the currently-executed erase or program command. Based on the assessed progress, the memory controller decides whether to suspend, abort or complete the erase or program command before executing the read command. In other embodiments aborting is not considered, and the memory controller chooses between suspending and completing the erase or program command.

In an example embodiment, the memory provides a progress indication that is indicative of the execution progress of the erase or program command. The progress indication may indicate, for example, the remaining execution time or the portion of the command that has been executed so far. The memory controller obtains the progress indication and uses it in making the abort/suspend/complete decision. The progress indication may be provided, for example, in a status register that is accessible to the memory controller even when the memory is busy.

The disclosed techniques enable the memory controller to minimize the latency of read commands, and to avoid unnecessary suspension and resumption of erase or program commands. Memory systems that use these techniques can thus achieve increased readout throughput and reduced latency. As a result, the overall system performance and user experience can be improved.

System Description

FIG. 1 is a block diagram that schematically illustrates a memory system 20, in accordance with an embodiment of the present invention. System 20 can be used in various host systems and devices, such as in computing devices, cellular phones or other communication terminals, removable memory modules (sometimes referred to as "USB Flash Drives"), Solid State Disks (SSD), digital cameras, music and other media players and/or any other system or device in which data is stored and retrieved.

System 20 comprises a memory device 24, which stores data in a memory cell array 28. The memory array comprises multiple memory blocks 34. Each memory block 34 comprises multiple analog memory cells 32. In the context of the present patent application and in the claims, the term "analog memory cell" is used to describe any memory cell that holds a continuous, analog value of a physical parameter, such as an electrical voltage or charge. Array 28 may comprise analog memory cells of any kind, such as, for example, NAND, NOR and Charge Trap Flash (CTF) Flash cells, phase change RAM (PRAM, also referred to as Phase Change Memory—PCM), Nitride Read Only Memory (NROM), Ferroelectric RAM (FRAM), magnetic RAM (MRAM) and/or Dynamic RAM (DRAM) cells. Although the embodiments described herein refer mainly to two-dimensional (2D) cell connectivity schemes, the disclosed techniques are applicable to three-dimensional (3D) connectivity schemes, as well.

The charge levels stored in the cells and/or the analog voltages or currents written into and read out of the cells are referred to herein collectively as analog values, analog storage values or storage values. The storage values may comprise, for example, threshold voltages or any other suitable kind of storage values. System 20 stores data in the analog memory cells by programming the cells to assume respective programming states, which are also referred to as programming levels. The programming states are selected from a finite set of possible states, and each programming state corresponds to a certain nominal storage value. For example, a 3 bit/cell MLC can be programmed to assume one of eight possible programming states by writing one of eight possible nominal storage values into the cell.

Memory device 24 comprises a reading/writing (R/W) unit 36, which converts data for storage in the memory device to analog storage values and writes them into memory cells 32. In alternative embodiments, the R/W unit does not perform the conversion, but is provided with voltage samples, i.e., with the storage values for storage in the cells. When reading data out of array 28, R/W unit 36 converts the storage values of memory cells into digital samples having a resolution of one or more bits. Data is typically written to and read from the memory cells in groups that are referred to as pages. In some embodiments, the R/W unit can erase a group of cells 32 by applying one or more negative erasure pulses to the cells. Erasure is typically performed in entire memory blocks.

The storage and retrieval of data in and out of memory device 24 is performed by a memory controller 40. The memory controller comprises an interface 44 for communicating with memory device 24, and a processor 48 that carries out the various memory management functions. Memory controller 40 communicates with a host 52, for accepting data for storage in the memory device and for outputting data retrieved from the memory device. Memory controller 40, and in particular processor 48, may be implemented in hardware. Alternatively, the memory controller may comprise a microprocessor that runs suitable software, or a combination of hardware and software elements.

The configuration of FIG. 1 is an exemplary system configuration, which is shown purely for the sake of conceptual clarity. Any other suitable memory system configuration can also be used. Elements that are not necessary for understanding the principles of the present invention, such as various interfaces, addressing circuits, timing and sequencing circuits and debugging circuits, have been omitted from the figure for clarity.

Although the example of FIG. 1 shows a single memory device 24, system 20 may comprise multiple memory devices that are controlled by memory controller 40. In the exemplary system configuration shown in FIG. 1, memory device 24 and memory controller 40 are implemented as two separate Integrated Circuits (ICs). In alternative embodiments, however, the memory device and the memory controller may be integrated on separate semiconductor dies in a single Multi-Chip Package (MCP) or System on Chip (SoC), and may be interconnected by an internal bus. Further alternatively, some or all of the memory controller circuitry may reside on the same die on which the memory array is disposed. Further alternatively, some or all of the functionality of memory controller 40 can be implemented in software and carried out by a processor or other element of the host system. In some embodiments, host 44 and memory controller 40 may be fabricated on the same die, or on separate dies in the same device package.

In some embodiments, memory controller 40 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In an example configuration of array 28, memory cells 32 are arranged in multiple rows and columns, and each memory cell comprises a floating-gate transistor. The gates of the transistors in each row are connected by word lines, and the sources of the transistors in each column are connected by bit lines. In some embodiments, the memory cells of a given bit line are divided into groups that are referred to as strings. The memory cells in each string are connected source-to-drain in series with one another, between the bit line and ground. Each string can typically be connected and disconnected individually to the bit line.

The memory array is typically divided into multiple pages, i.e., groups of memory cells that are programmed and read simultaneously. Pages are sometimes sub-divided into sectors. In some embodiments, each page comprises an entire row of the array. In alternative embodiments, each row (word line) can be divided into two or more pages. For example, in some devices each row is divided into two pages, one comprising the odd-order cells and the other comprising the even-order cells.

Typically, memory controller 40 programs data in page units, but erases entire memory blocks 34. Typically although not necessarily, a memory block is on the order of $10^6$ memory cells, whereas a page is on the order of $10^3$-$10^4$ memory cells.

The description that follows describes techniques for conditional suspension of memory access commands. The disclosed techniques can be carried out by memory controller 40 and/or by R/W unit 36. For the sake of clarity, the description that follows refers to a particular division of functions between R/W unit 36 in the memory device and processor 48 in memory controller 40. Generally, however, the various tasks making-up the disclosed techniques can be divided between the memory controller and the R/W unit in any suitable manner, or performed by any one of these elements. Thus, in the context of the present patent application and in the claims, memory controller 40 and R/W circuitry 36 are referred to jointly as storage circuitry that carries out the disclosed techniques.

Conditional Suspension of Erase or Program Commands

In many practical scenarios, memory controller 40 initiates a read command while a program or erase command is already in progress. In some embodiments, memory controller 40 and memory device 24 support a suspend-resume mechanism that suspends the program or erase command, executes the read command and then resumes the programs or erase command. The memory controller uses the suspend-resume mechanism selectively, only in cases in which suspending the program or erase command helps to reduce the latency of the read command.

Figure 2:
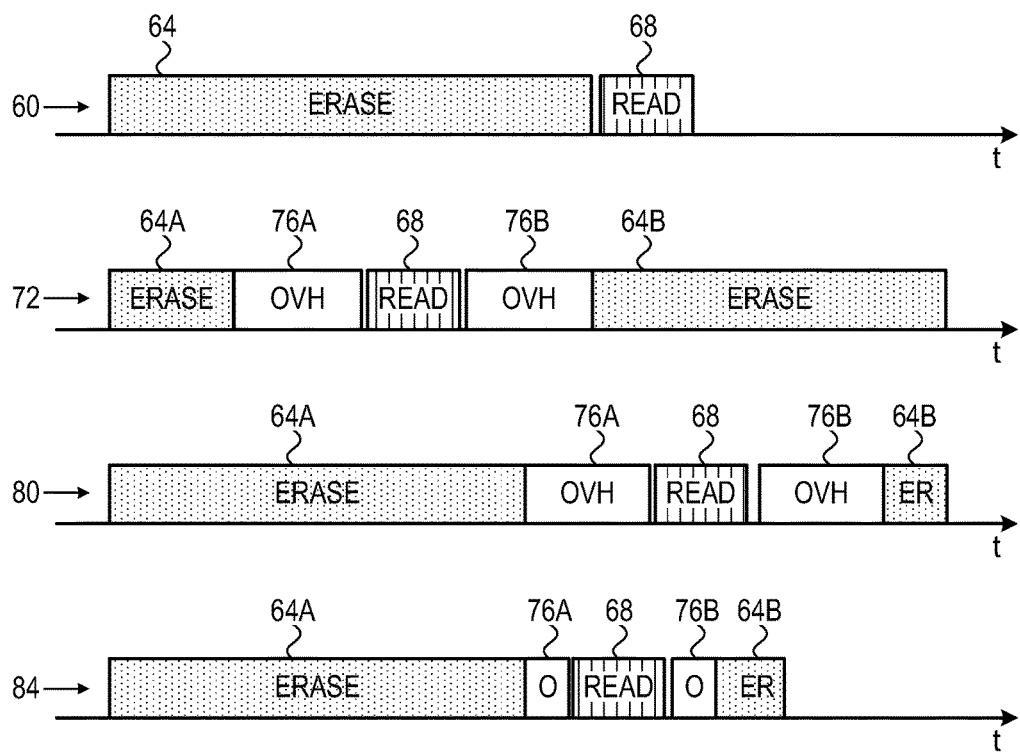
FIG. 2 is a diagram that schematically illustrates execution time-lines in a memory system, in accordance with embodiments of the present invention.

FIG. 2 is a diagram that schematically illustrates execution time-lines in system 20, in accordance with embodiments of the present invention. The time-lines of FIG. 2 demonstrate why it is not always preferable to suspend the program or erase command. The figure refers to an erase command, but the same trade-offs apply to program commands.

A time-line 60 shows a reference scenario in which an erase command 64 is allowed to complete and only then a read command 68 is executed. A time-line 72 shows a scenario in which erase command 64 is suspended in order to execute read command 68, and then resumed. The first portion of the erase command, which is executed before the suspension, is denoted 64A. The remaining portion of the erase command, which is executed after the resumption, is denoted 64B.

In addition, the suspension and resumption incur certain time overheads. The time overhead incurred by the suspension of the read command is denoted 76A, and the time overhead incurred by the resumption of the read command is denoted 76B. The overhead may be caused by various actions, such as storing and retrieving the memory device page buffers in a program command, and storing and retrieving the command status in both program and erase commands. For example, writing a 32 KB multi-plane Most Significant Bit (MSB) page in a NAND Flash device having a 400 MB/S interface incurs an overhead on the order of 80 μS. For a 200 MB/S interface, or for a 64 KB multi-plane MSB page and a 400 MB/S interface, the suspension overhead is on the order of 160 μS.

As can be seen in the figure, the read command in time-line 72 ends before the read command in time-line 60. In time-line 72, the erase command is suspended in its early stages of execution, and therefore the suspension helps to reduce the latency of the read command even in the presence of suspension overhead 76A. In such a situation, the memory controller will typically choose to suspend the erase command.

A time-line 80 shows a different scenario, which demonstrates that suspending the erase command in a later stage of execution may not reduce the latency of the read command, and may even increase it. As can be seen in the figure, the read command in time-line 80 ends later than the read command in time-line 60, because of suspension overhead 76A. Because of the suspension overhead, if the read command is initiated when the erase command is near completion, it is better to allow the erase command to complete rather than suspend it. In such a situation, the memory controller will typically choose not to suspend the erase command.

A time-line 84 demonstrates that the above trade-off depends on the length of the suspension overhead. In time-line 84 the erase command is suspended at the same time as in time-line 80. Unlike time-line 80, in time-line 84 the read command ends earlier than in time-line 60, because overhead 76A is shorter. In other words, the length of the suspension overhead determines the latest time in which it is still preferable to suspend the erase command. Thus, in some embodiments the memory controller chooses whether or not to suspend the erase command based on the length of the suspension overhead.

If the read command is initiated in the very early stages of the program or erase command, it may even be preferable to abort the program or erase command and restart the command from the beginning after the read command, instead of suspending and resuming. In a program command, for example, the first programming iterations do not change the state of the memory cells considerably, and it may be faster to abort and restart the command instead of suspending and resuming it.

In addition to the overhead size, the decision whether to suspend the program or erase command may also depend on the length of the command in question. In some embodiments, the memory controller estimates the average expected length of the program or erase command, and decide whether or not to suspend based on the estimated length. The memory controller may estimate the expected command length, for example, by tracking similar commands and measuring their lengths.

In some embodiments, memory controller 40 obtains from memory device 24 a progress indication, which is indicative of the execution progress of the program or erase command. In an example embodiment, R/W unit 36 of the memory device stores the current progress indication in a status register that is accessible to the memory controller. The memory controller reads the status register using a "read status" command. The status register is accessible using the read status command even when the memory device is busy executing the program or erase command (e.g., even when the ready-busy (RnB) line of the memory device is low). Alternatively, the memory controller may obtain the progress indication from the memory device using any other suitable mechanism or interface.

The status indication provided by the memory device may be of any suitable format, and may indicate the execution progress in any desired manner. Consider, for example, a program command that programs a group of memory cells 32 by applying a sequence of programming and verification (P&V) iterations, or an erase command that erases a memory block by applying a sequence of erasure iterations. In such a program command, the progress indication may be indicative of the number of iterations that were already performed. Alternatively, the progress indication may be indicative of the number or percentage of the memory cells that have reached their intended programming or erasure level.

As another example, in an erasure operation, the progress indication may be indicative of the fraction or percentage of the memory block that has been erased, e.g., the number of bit-lines that have been erased. As yet another example, the progress indication may comprise a single flag or bit, which indicates to the memory controller whether it is preferable to suspend the command or not. For example, it is possible to calculate the latest point in time at which it is still beneficial to suspend the program or erase command (based on the known length of the suspension overhead). The memory device toggles the progress indication flag at the pre-computed point in time along the execution of the program or erase command.

Further alternatively, the memory controller and memory device may use any other suitable progress indication.

Figure 3:
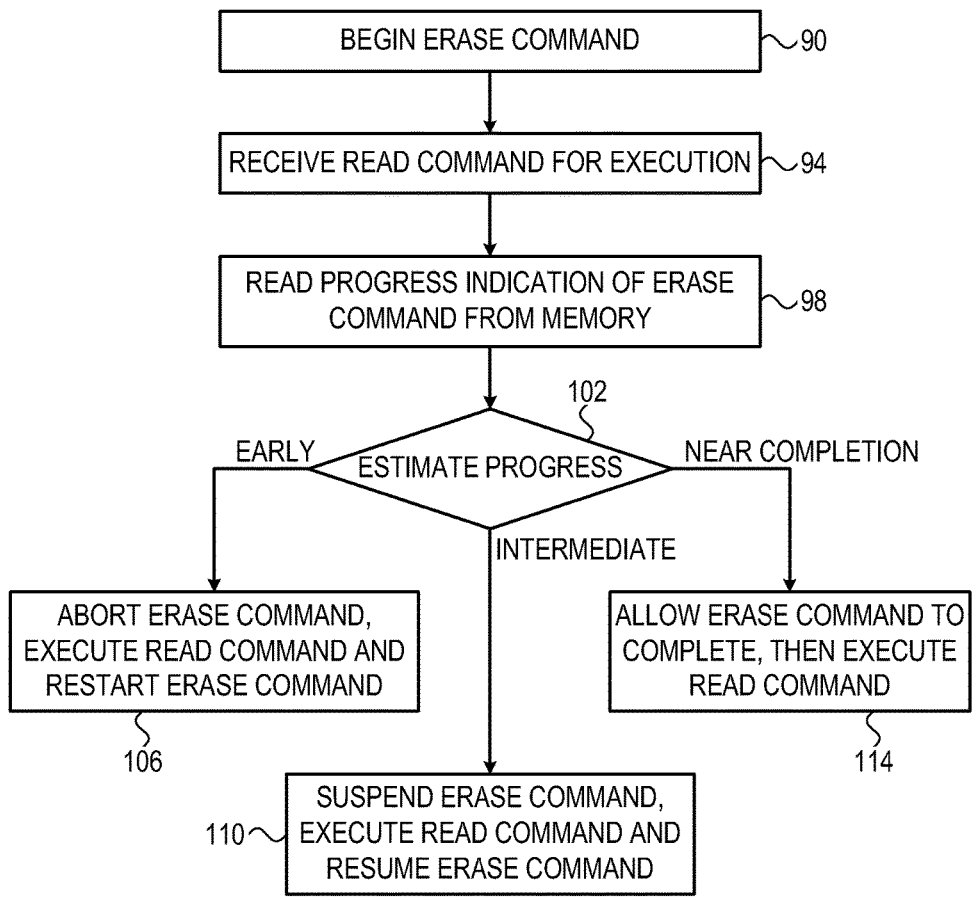
FIG. 3 is a flow chart that schematically illustrates a method for command execution in a memory, in accordance with an embodiment of the present invention.

FIG. 3 is a flow chart that schematically illustrates a method for command execution in a memory, in accordance with an embodiment of the present invention. The description that follows refers to an erase command, but the method can be applied in a similar manner to a program command. The method begins with memory controller 40 beginning to execute an erase command that erases a memory block in memory device 24, at an erase initiation step 90. At some point during the execution of the erase command, memory controller 40 receives a read command for execution in memory device 24, at a read command reception 94.

Memory controller 40 reads the progress indication for the erase command from memory device 24, at a progress readout step 98. For example, the memory controller may issue a "read status" command to read an appropriate status register from the memory device. The memory controller estimates the execution progress of the erase command, at a progress estimation step 102.

If the execution progress indicates that the erase command is in its early stage of execution, the memory controller instructs the memory device to abort the erase command, then to execute the read command, and then to restart the erase command, at an abortion step 106.

If the execution progress indicates that the erase command is in an intermediate stage of execution, the memory controller instructs the memory device to suspend the erase command, then execute the read command, and then resume the erase command, at a suspension step 110.

If the execution progress indicates that the erase command is in its final stage of execution, the memory controller allows the erase command to complete without interruption, and then executes the read command, at a completion step 114.

In alternative embodiments, the memory controller does not consider aborting the erase command, and only chooses between suspending the command and allowing the command to complete.

Although the embodiments described herein mainly address conditional suspension or abortion of program and erase commands in order to execute read commands, the methods and systems described herein can also be used for conditional suspension or abortion of any other suitable command type, in order to execute any other suitable command type.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
receiving, by a memory controller, a first memory access operation for a memory device;
in response to receiving the first memory access operation, determining, by the memory controller, a latest point in time for suspending execution of the first memory access operation, wherein the latest point in time is based on a difference between a time overhead for suspending the first memory access operation and a total execution time for the first memory access operation;
monitoring, by the memory device, progress of the execution of the first memory access operation to determine whether the latest point in time has been reached;
in response to receiving a second memory access operation for execution during the execution of the first memory access operation, reading, by the memory controller, a value from the memory device that indicates that the latest point in time has not been reached;
suspending, by the memory controller, the execution of the first memory access operation in order to execute the second memory access operation based on the value from the memory device;
receiving, by the memory controller via an interface, a current status of the first memory access operation from the memory device, wherein the receiving is in response to suspending the execution of the first memory access operation; and
storing, by the memory controller, the received status of the first memory access operation.

2. The method according to claim 1, wherein the first memory access operation comprises a programming command or an erasure command, and wherein the second memory access operation comprises a read command.

3. The method according to claim 1, further comprising resuming the execution of the first memory access operation using the stored status of the first memory access operation in response to determining that the second memory access operation has completed.

4. The method according to claim 3, further comprising:
receiving a third memory access operation after resuming execution of the first memory access operation; and
allowing the execution of the first memory access operation to complete in response to determining that the value from the memory device indicates that the latest point in time has been reached.

5. The method according to claim 1, wherein monitoring the progress of the execution of the first memory access operation comprises reading a progress indication from a register of the memory device that is accessible during the execution of the first memory access operation.

6. The method according to claim 1, wherein executing the first memory access operation comprises performing a sequence of programming or erasure iterations, and wherein monitoring the progress of the execution of the first memory access operation comprises obtaining a count of the programming or erasure iterations that have been performed.

7. The method according to claim 1, wherein executing the first memory access operation comprises performing a sequence of programming or erasure iterations, and wherein monitoring the progress of the execution of the first memory access operation comprises obtaining a count of memory cells whose programming or erasure has been completed.

8. The method according to claim 1, wherein executing the first memory access operation comprises erasing a region of the memory device, and wherein monitoring the progress of the execution of the first memory access operation comprises obtaining a number indicative of a portion of the region whose erasure has been completed.

9. The method according to claim 1, wherein determining the latest point in time for suspending the execution of the first memory access operation further comprises determining the total execution time for the first memory access operation by estimating an expected length of the execution of the first memory access operation.

10. The method according to claim 9, wherein estimating the expected length of the execution of the first memory access operation comprises measuring an execution time of at least one similar memory access operation that has been previously executed.

11. An apparatus, comprising:
an interface unit configured to communicate with a memory; and
a processor configured to:
send a first memory access operation to the memory for execution;
in response to sending the first memory access operation, determine a latest point in time for suspending execution of the first memory access operation, wherein the latest point in time is based on a difference between a time overhead for suspending the first memory access operation and a total execution time for the first memory access operation;
monitor progress of the execution of the first memory access operation to determine whether the latest point in time has been reached;
in response to a determination that a second memory access operation is ready for the memory to execute during the execution of the first memory access operation, read a value from the memory, via the interface unit, that indicates that the latest point in time has not been reached;
suspend the execution of the first memory access operation in order to execute the second memory access operation based on the value read from the memory;

in response to suspending the execution of the first memory access operation, receive via the interface unit, a current status of the first memory access operation from the memory; and store the received status of the first memory access operation.

12. The apparatus according to claim 11, wherein the first memory access operation comprises a programming command or an erasure command, and wherein the second memory access operation comprises a read command.

13. The apparatus according to claim 11, wherein the processor is further configured to resume the execution of the first memory access operation using the stored status of the first memory access operation in response to a determination that the second memory access operation has completed.

14. The apparatus according to claim 11, wherein the processor is further configured to:

determine that a third memory access operation is ready for the memory to execute after resuming the execution of the first memory access operation; and allow the execution of the first memory access operation in response to a determination that the current value from the memory indicates that the latest point in time has been reached.

15. The apparatus according to claim 11, wherein to monitor the progress of the execution of the first memory access operation, the processor is further configured to read a progress indication from a register of the memory that is accessible during the execution of the first memory access operation.

16. The apparatus according to claim 11, wherein the first memory access operation includes an erase operation which includes a sequence of programming or erasure iterations, and wherein to monitor the progress of the execution of the first memory access operation, the processor is further configured to obtain from the memory a count of the programming or erasure iterations that have been performed.

17. The apparatus according to claim 11, wherein to monitor the progress of the execution of the first memory access operation, the processor is further configured to obtain from the memory a count of memory cells whose programming or erasure has been completed.

18. The apparatus according to claim 11, wherein the first memory access operation includes an erase operation on a region of the memory, and wherein to monitor the progress of the execution of the first memory access operation, the processor is further configured to obtain from the memory a number indicative of an amount of the region whose erasure has been completed.

19. The apparatus according to claim 11, wherein to determine the latest point in time for suspending the execution of the first memory access operation, the processor is further configured to estimate an expected time length of the execution of the first memory access operation.

20. The apparatus according to claim 19, wherein to estimate the expected time length of the execution of the first memory access operation, the processor is further configured to measure an execution time of at least one similar memory access operation that has been previously executed.

21. An apparatus, comprising:
a memory; and
a controller, which is configured to:
send a first memory access operation to the memory for execution;

in response to sending the first memory access operation, determine a latest point in time for suspending execution of the first memory access operation, wherein the latest point in time is based on a difference between a time overhead for suspending the first memory access operation and a total execution time for the first memory access operation;

monitor progress of the execution of the first memory access operation to determine whether the latest point in time has been reached;

in response to a determination that a second memory access operation is ready for the memory to execute during the execution of the first memory access operation, read a value from the memory that indicates that the latest point in time has not been reached;

suspend the execution of the first memory access operation in order to execute the second memory access operation based on the value read from the memory;

in response to suspending the execution of the first memory access operation, receive a current status of the first memory access operation from the memory; and store the received status of the first memory access operation.

* * * * *